May 14, 1957 G. C. WORRELL 2,791,822
SINGLE SPINDLE AUTOMATIC SCREW MACHINE
Filed Aug. 12, 1953 12 Sheets-Sheet 1
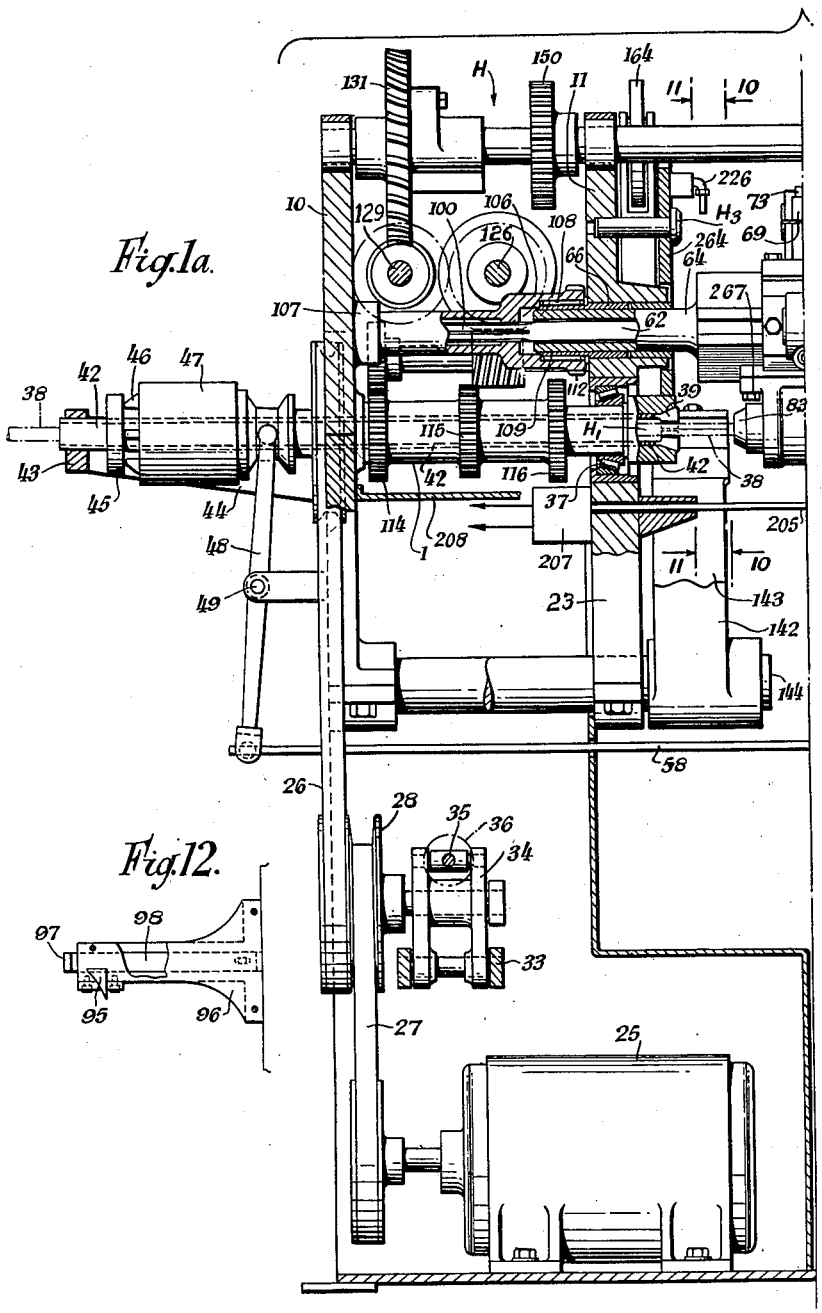
INVENTOR
Guy C. Worrell
BY
Chapin & Neal
ATTORNEY

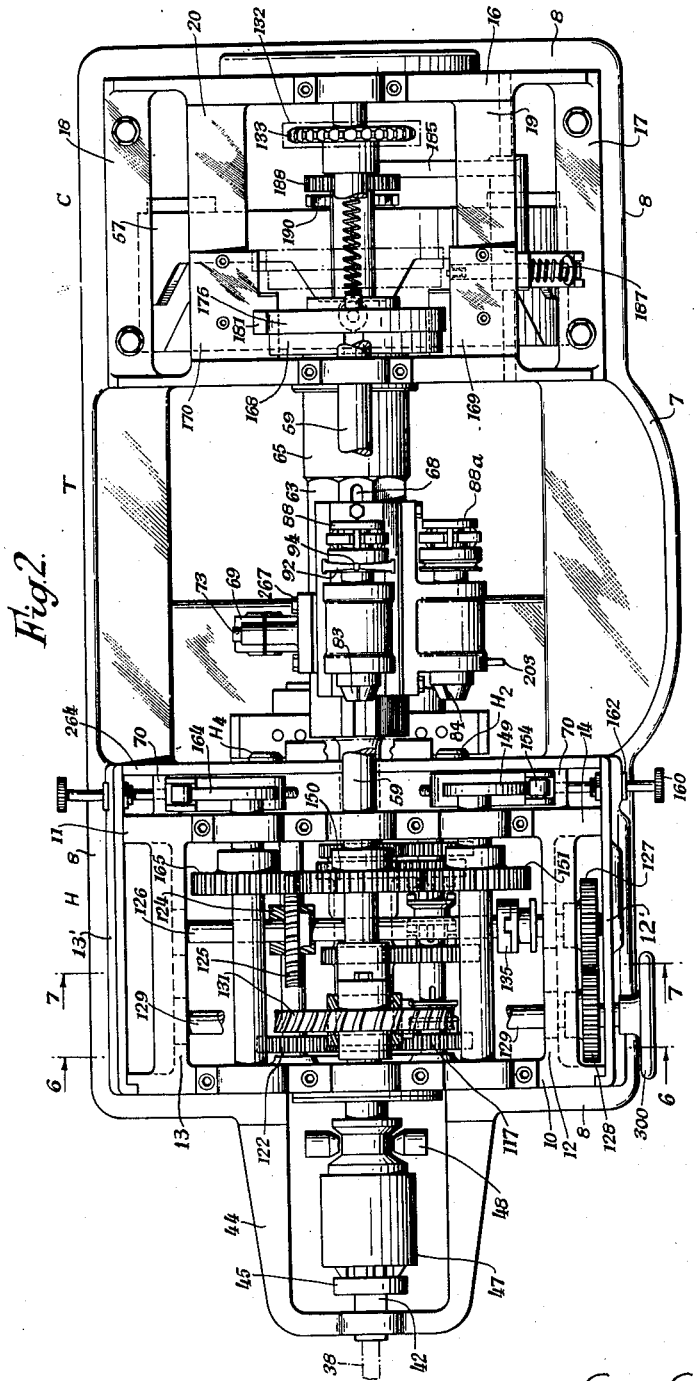

May 14, 1957 G. C. WORRELL 2,791,822
SINGLE SPINDLE AUTOMATIC SCREW MACHINE
Filed Aug. 12, 1953 12 Sheets-Sheet 4
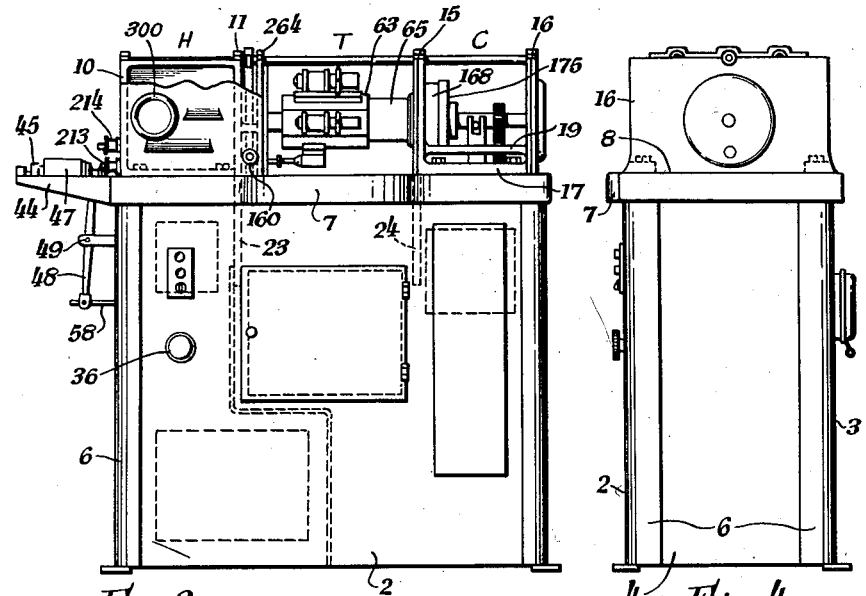
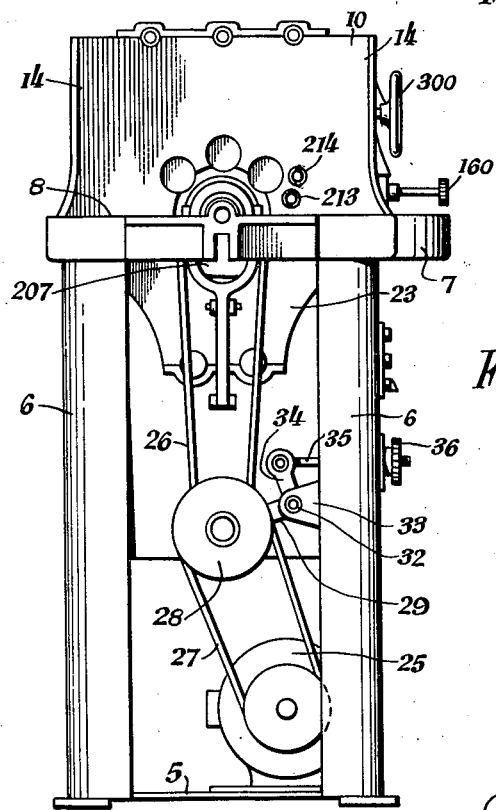
INVENTOR
Guy C. Worrell
BY Chapin & Neal
ATTORNEY

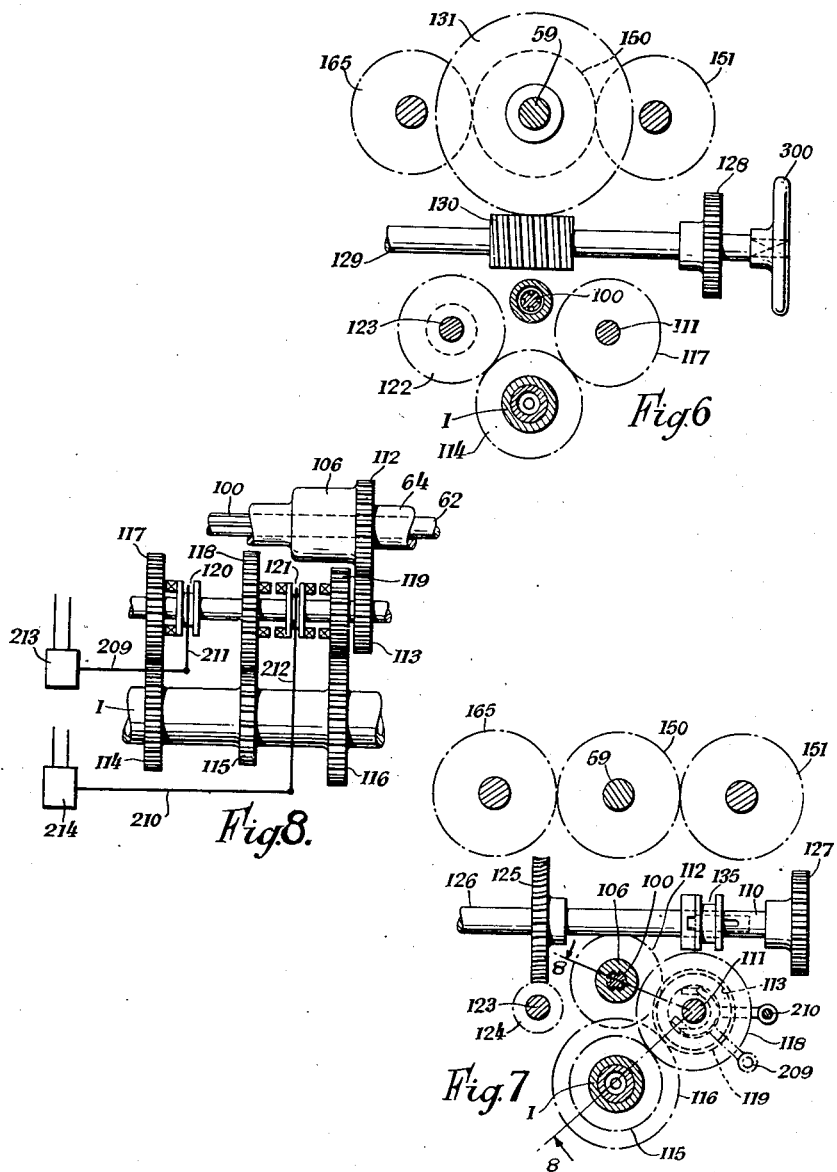

May 14, 1957  G. C. WORRELL  2,791,822
SINGLE SPINDLE AUTOMATIC SCREW MACHINE
Filed Aug. 12, 1953  12 Sheets-Sheet 6
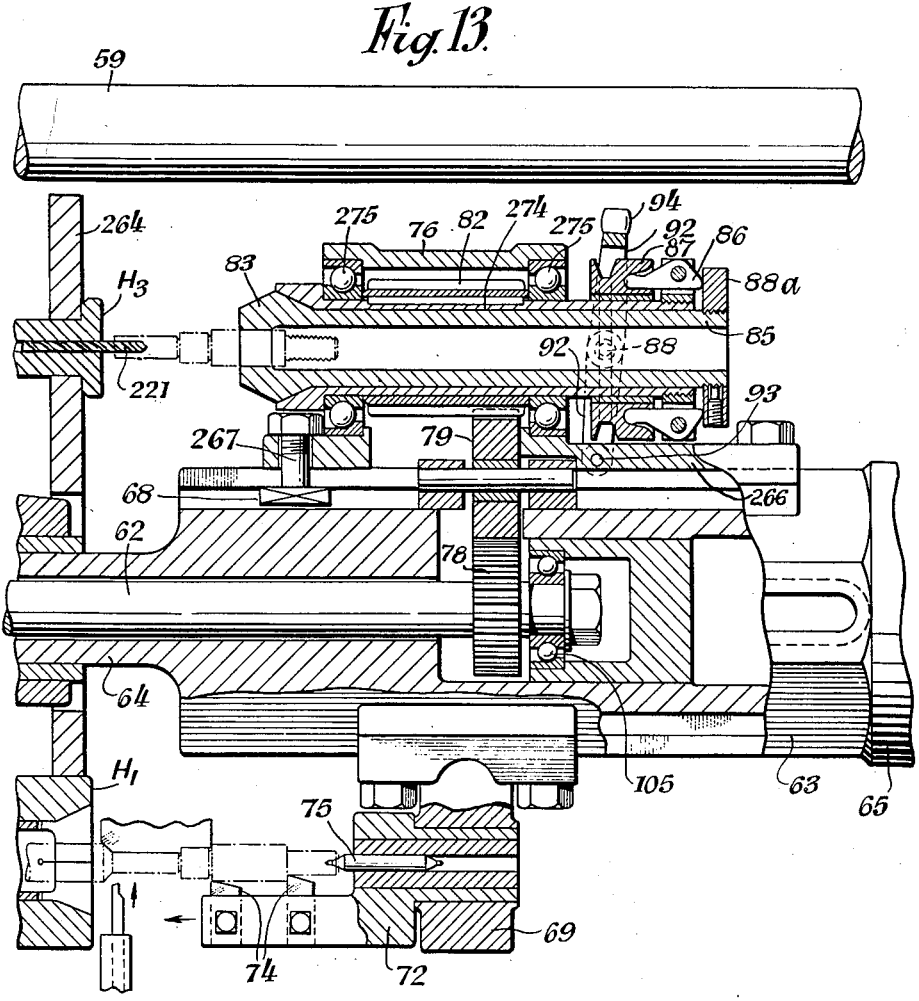
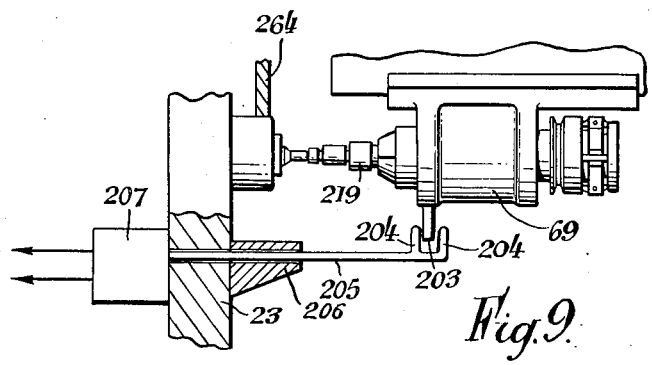
INVENTOR
BY Guy C. Worrell
Chapin + Neal
ATTORNEY May 14, 1957  G. C. WORRELL  2,791,822
SINGLE SPINDLE AUTOMATIC SCREW MACHINE
Filed Aug. 12, 1953  12 Sheets-Sheet 7
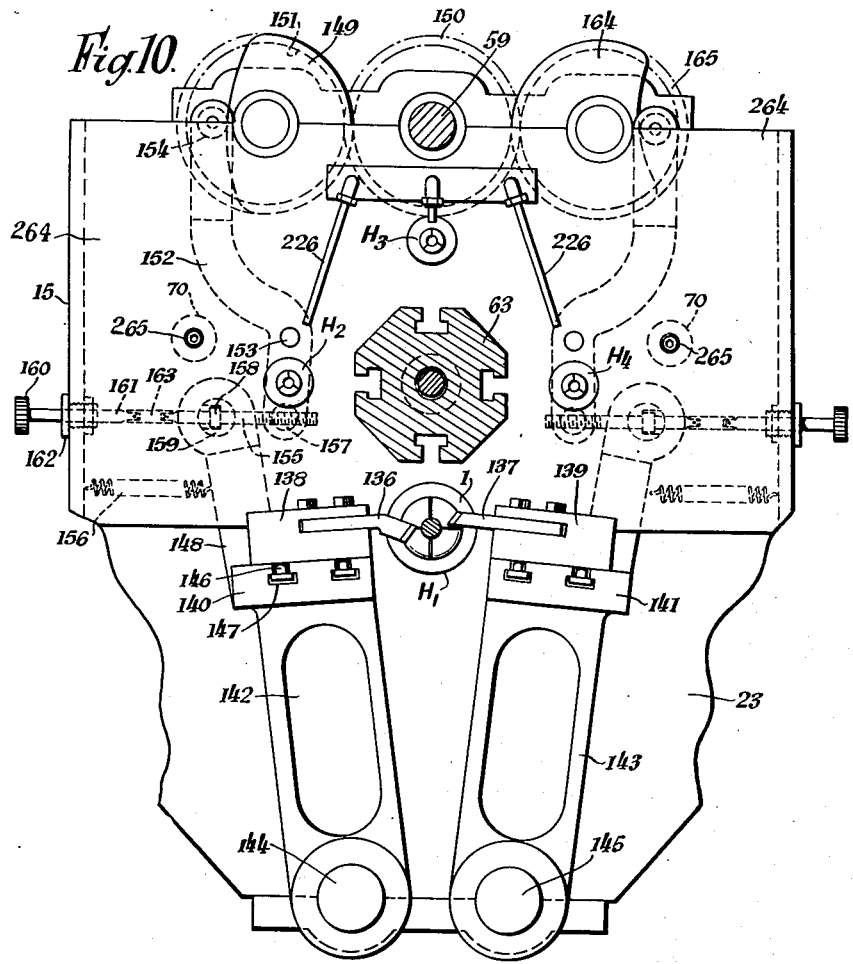
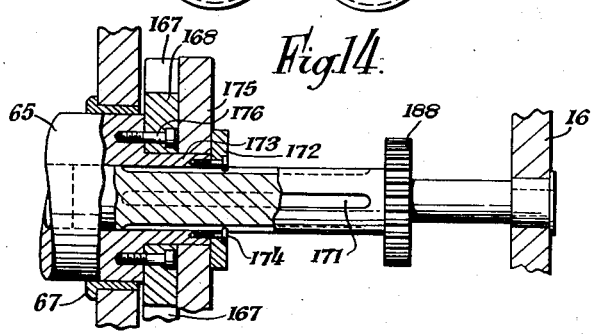
INVENTOR
Guy C. Worrell
BY
Chapin & Neal
ATTORNEY

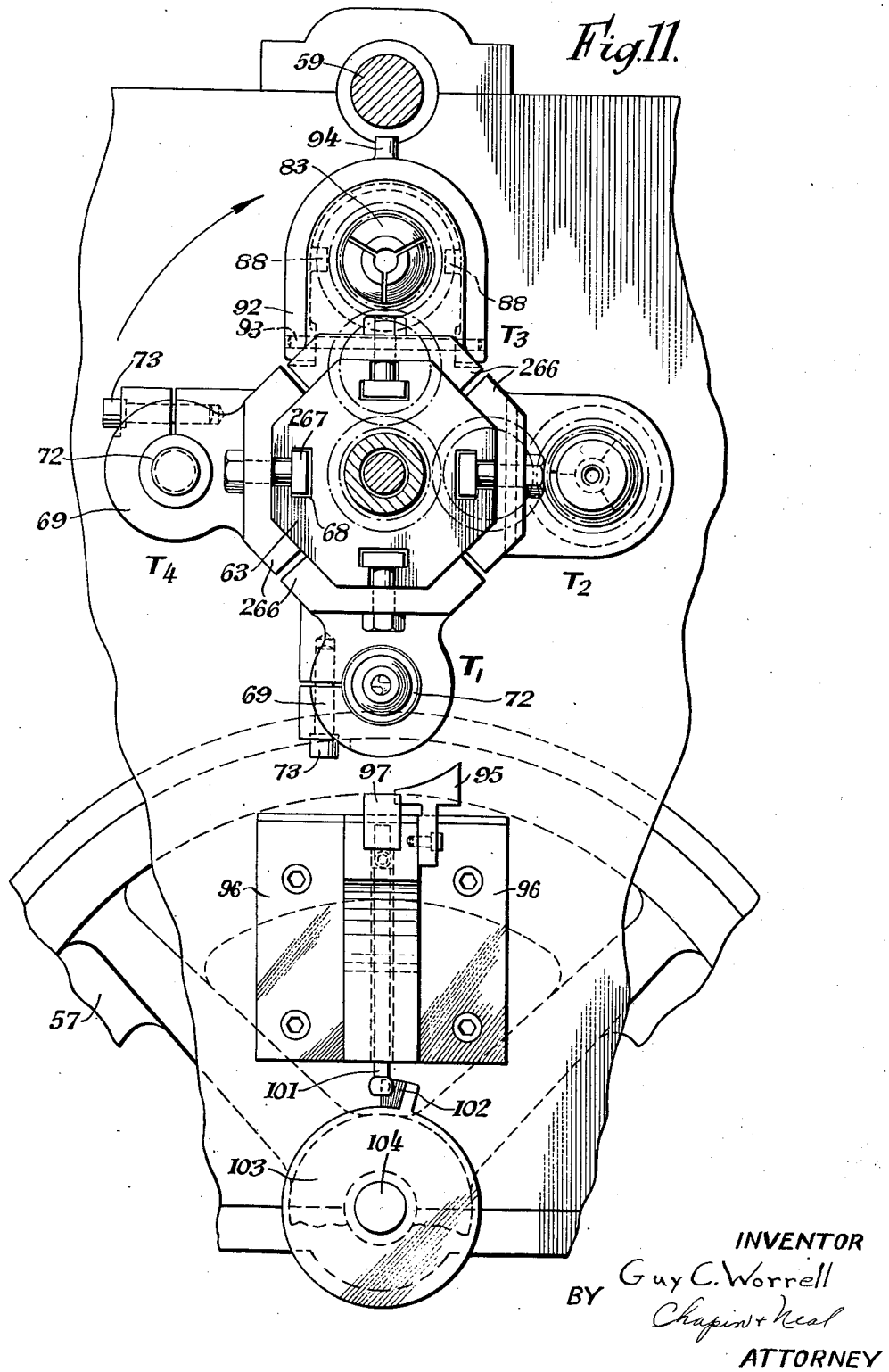

May 14, 1957 G. C. WORRELL 2,791,822
SINGLE SPINDLE AUTOMATIC SCREW MACHINE
Filed Aug. 12, 1953 12 Sheets-Sheet 9

INVENTOR
BY Guy C. Worrell
Chapin & Neal
ATTORNEY

May 14, 1957 G. C. WORRELL 2,791,822
SINGLE SPINDLE AUTOMATIC SCREW MACHINE
Filed Aug. 12, 1953 12 Sheets-Sheet 10
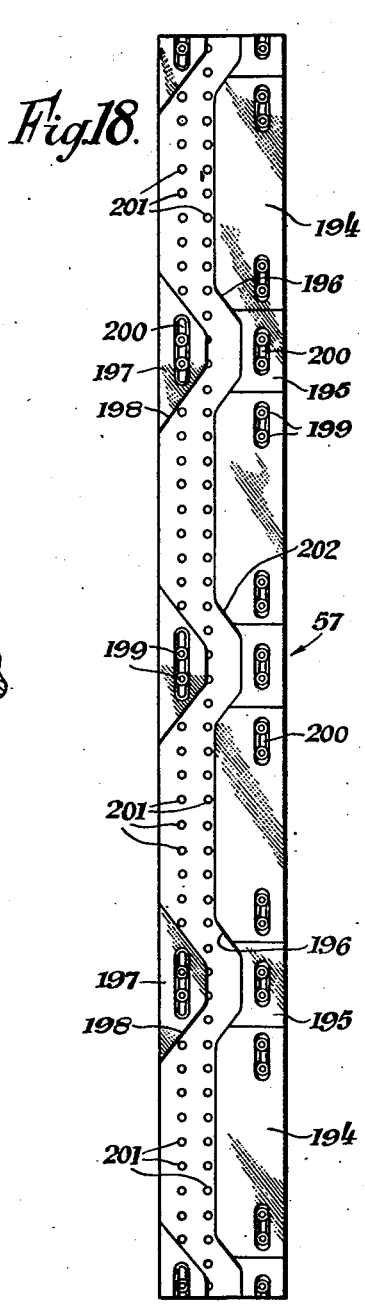
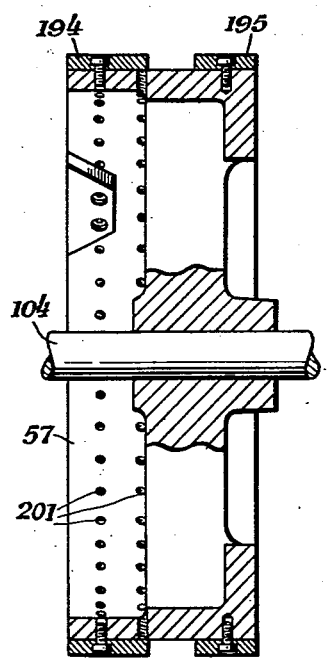
Fig.18.
Fig.17.
INVENTOR
Guy C. Worrell
BY Chapin & Neal
ATTORNEY

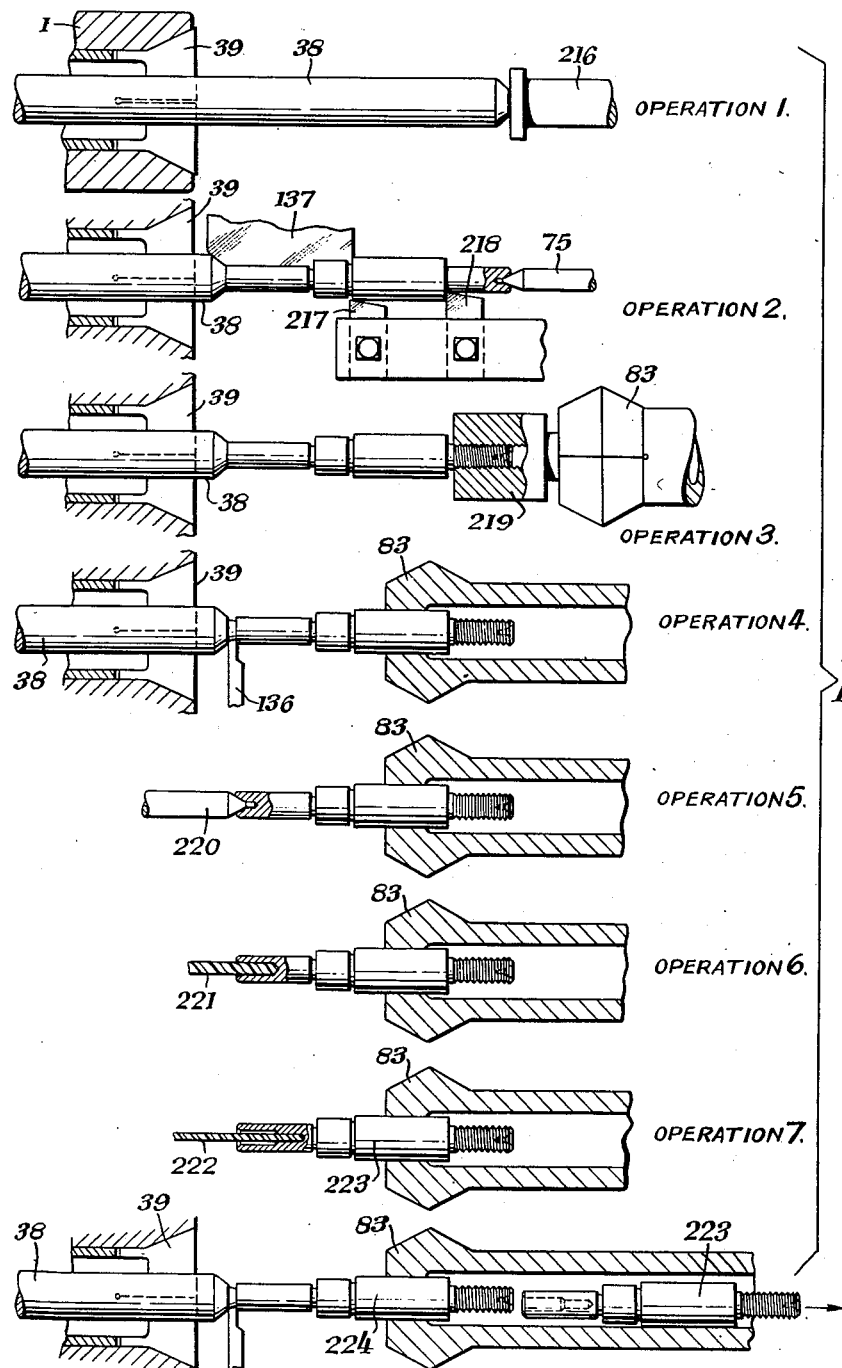

United States Patent Office 2,791,822
Patented May 14, 1957

2,791,822
SINGLE SPINDLE AUTOMATIC SCREW MACHINE

Guy C. Worrell, Westfield, Mass.

Application August 12, 1953, Serial No. 373,875

9 Claims. (Cl. 29—37)

This invention relates to automatic turret lathes of the kind in which the axis of the turret is arranged parallel to the axis of a bar or stock which is fed forward at intervals so that machining operations may be carried out on the end of the bar, the component thus formed being then parted from the bar. In such machines it is usual to mount the turret so that it may be rotated to any one of a number of positions in which the turret stations are brought in succession into line with the axis of the bar whereby a tool carried by the turret station carries out an operation on the rotating bar. The turret may be moved lengthwise during the course of each operation. After each operation is completed the turret is withdrawn, rotated to a new position with a different turret station coinciding with the axis of the bar and locked in position while a further operation is carried out.

The invention comprises an automatic turret lathe in which the axis of the turret is arranged parallel to the axis of the bar or stock and in which the rotatable bar or stock is mounted in a fixed headstock, comprising, a plurality of fixed headstock stations arranged concentrically with the axis of the turret, the bar or stock being located at one such station, and the same plurality of turret stations also concentric with the axis of the turret, the stations in each set being equi-angularly disposed and at equal distances from the turret axis whereby each of the turret stations coincides with a headstock station for all rotational settings of the turret.

The invention also comprises an automatic turret lathe in which the axis of the turret is arranged parallel to the axis of the bar or stock and in which the rotatable bar or stock is mounted in a fixed headstock, comprising, a plurality of fixed headstock stations concentric with the turret axis and disposed equi-angularly, a corresponding number of turret stations, the positions of which correspond with the headstock stations, non-rotatable elements carrying tools at some of the turret stations, rotatable elements carried at other turret stations and adapted to hold a tool or a partly finished component parted from the bar or stock and fixed tools at the headstock stations.

The invention further comprises an automatic turret lathe in which the axis of the turret is arranged parallel to the axis of the bar or stock and in which the rotatable bar or stock is mounted in a fixed headstock, comprising, a plurality of headstock stations at equal distances from the turret axis and spaced equi-angularly, the bar or stock being located at one of said headstock stations, an equal number of turret stations also spaced equi-angularly and at the same distance from the turret axis as the headstock stations, the distance between the axes of the bar and the turret being equal to the said radial distances, non-rotational tools located at some turret stations, rotational elements carrying tools at other turret stations and rotional elements at still other turret stations carrying partly machined components adapted to co-operate with fixed cutting elements at the headstock stations.

The invention still further comprises an automatic turret lathe in which the axis of the turret is arranged parallel to the axis of the bar or stock and in which the rotatable bar or stock is mounted in a fixed headstock, comprising, a plurality of fixed headstock stations, the bar or stock being located at one such station, the same plurality of turret stations so spaced that all the turret stations correspond with all the headstock stations for any rotational adjustment of the turret, non-rotatable tools carried at turret stations to co-operate with the rotatable bar, rotatable elements supporting tools carried at some other turret stations to co-operate with the rotatable bar, rotatable elements carried at other turret stations adapted to hold and rotate a partly finished component parted from the bar and fixed tools carried at the headstock stations adapted to carry out machining operations on said partly finished components.

An embodiment of the invention is shown by way of example in the accompanying drawings:

Figures 1a and 1b comprise a sectional elevation of the machine with portions cut away along the axes of the main driving spindle and the turret;

Figure 2 shows a plan with covers removed;

Figure 3 is a front elevation showing a main and two upper housings;

Figure 4 is an end elevation of Figure 3 as viewed from the right or control end;

Figure 5 is an end elevation of Figure 3 on a larger scale as viewed from the left or driving end;

Figure 6 is a diagrammatic section on the line 6—6 of Figure 2 showing driving gear only;

Figure 7 is a diagrammatic section on the line 7—7 of Figure 2 also showing driving gear only;

Figure 8 shows a developed view with three shafts in one plane as taken on the line 8—8 of Figure 7;

Figure 9 is a side elevational view of part of Figure 2 with an attachment carrying a screwing die in an operative position;

Figure 10 shows a vertical section on the line 10—10 of Figure 1a;

Figure 11 shows a vertical section on the line 11—11 of Figure 1a;

Figure 12 shows a plan of a detail also illustrated in Figures 1 and 11;

Figure 13 shows an enlarged part sectional elevation of the turret and turret attachments taken on the turret axis;

Figure 14 shows a part sectional elevation taken on the turret axis of the right or control end of the turret;

Figure 17 shows a sectional view of the control drum;

Figure 18 shows a developed view of cams on the periphery of the control drum;

Figure 20 shows a component at various stages during a complete cycle of machining operations.

In the embodiment shown, the axis of rotation of the turret is parallel to, but not co-axial with, the axis of the hollow main driving shaft 1, which is usually horizontal, the axis of rotation of the turret being spaced vertically above it. The invention is, however, not limited to this arrangement since the axis of the turret may be arranged below or in any other position relatively to the main driving shaft 1.

Figure 1B:
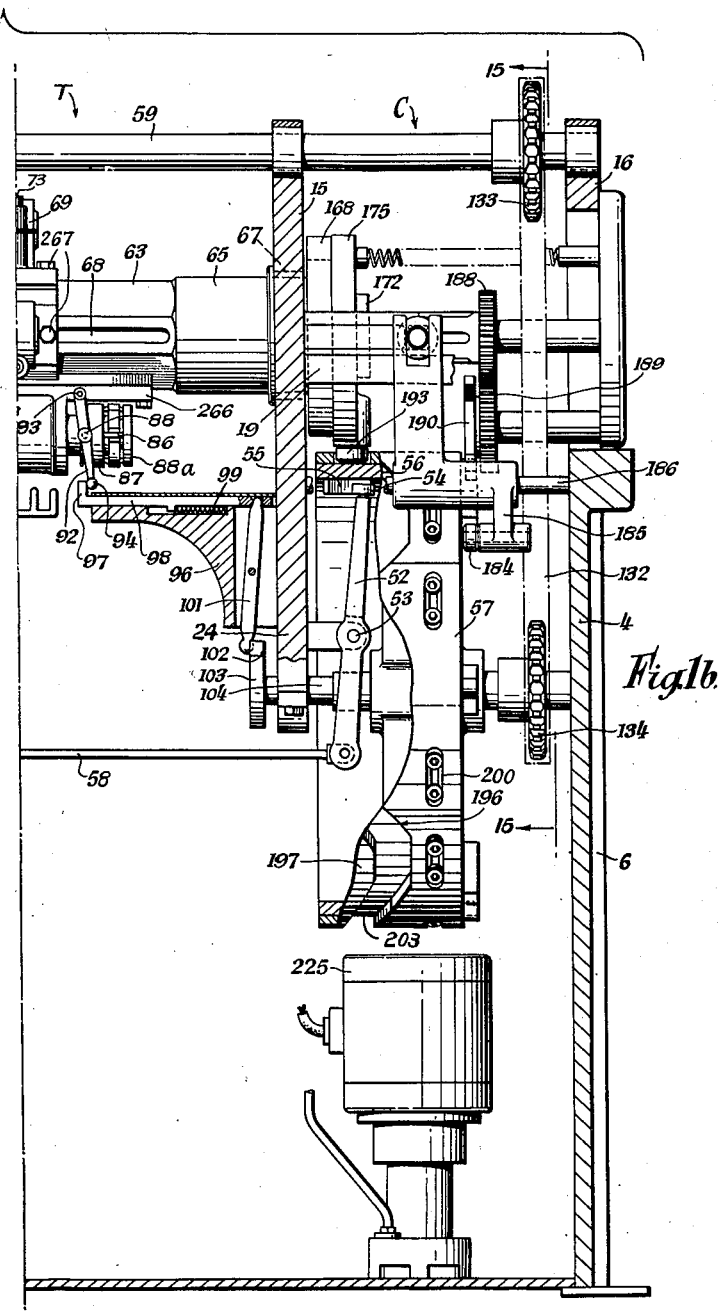

For convenience in describing the machine the various elements may be regarded as arranged in three groups. The first driving gear or headstock group H is located on the left, as shown in Figures 1a, 2 and 3 of the drawings, the turret and associated parts form the intermediate or turret group T (see also Fig. 1b) and the control drum and associated mechanism for controlling the operation of the turret and certain other parts form the third or control group C located on the right.

All the parts of the machine are supported by and are mostly enclosed within three metal housings conveniently fabricated by welding from steel plate of different thicknesses. The main or lower housing, Figures 1a and 1b through 5, is of generally rectangular shape having a front wall 2, a rear wall 3, an end wall 4 and a base 5. Shaped corner pieces 6 of comparatively small thickness may be welded in position. The left or driving end is partly closed only by the corner pieces 6. The front and rear walls have access openings with covers hinged or otherwise mounted in position. The upper part of the housing is bowed outwardly on the middle part 7 of the front and is extended outwardly and inwardly to provide a supporting surface 8 for the two upper housings which are bolted thereto.

The left or driving gear upper housing enclosing and supporting the driving gearing is of generally rectangular shape in plan with transverse walls 10, 11 and with front and rear walls 12, 13 having short extensions 14 at the front and back. A cover 12' at the front provides a space between the cover and the front wall 12 enclosing gear wheels. A similar cover 13' is provided at the rear.

The right or control upper housing together with the right part of the lower housing encloses the control mechanisms. This upper or control housing consists broadly of two substantial vertical metal plates 15, 16 running transversely of the machine and connected to one another by (a) two longitudinal bars 17, 18 forming part of the base resting upon the supporting surface 8 of the lower housing and (b) two bars 19, 20 parallel thereto also serving to support turret locking mechanism.

The lower housing is formed with two transverse partitions 23, 24 (Fig. 3) intermediate its ends coinciding with the inner transverse walls 11, 15 of the superimposed driving gear and control housings. These partitions, apart from stiffening the housing, support bearings as will be described hereinafter.

Referring to the first driving or headstock group H, an electric motor 25, Figures 1a, 1b and 5, drives the main hollow driving shaft 1 of the machine and the various other parts through V belts 26, 27 and pulleys, including an intermediate combined expanding and contracting V pulley 28 mounted on one arm 29 of a lever carried by a pivot 32 mounted by brackets 33 on the front wall 2 of the lower housing. The lever is adjusted by a second arm 34 connected to a screwed spindle 35 extending through the front wall 2 of the housing and engaging a knurled adjusting nut 36.

As the pulley 28 is adjusted so as to shorten one of the belts 26, 27 and lengthen the other, one part of the pulley 28 increases in width so as to increase its effective working diameter while the other part of the pulley correspondingly decreases in width. The adjustment shown on Figure 1 gives a high speed drive while that shown on Figure 5 gives a low speed.

The main driving shaft 1 is mounted in a taper roller bearing 37 at the right end close to the turret, the outer race being carried between the inner transverse wall 11 of the driving gear housing and the intermediate transverse wall 23 of the lower main housing. The other end of the main shaft 1 is similarly mounted in an opposed taper roller bearing between the transverse wall 10 of the driving gear housing and the supporting surface 8 of the lower housing.

The bar or stock 38 passes through the hollow main driving shaft 1 and is centered and driven by a collet 39 carried in the inner end of the driving shaft. The bar 38 is gripped automatically by the collet 39 at the beginning of the cycle of operations on each component and is released at the end, or, as may be required, at some intermediate point in the cycle. When released, it is moved forward by known means until the end engages a stop hereinafter described. The collet 39 has a conical outer surface adapted to engage a similar conical inner surface on the end of shaft 1 and is formed integral with the end of a tube 42 passing through the shaft 1, the outer end of this tube being supported by a bearing 43 at the end of an overhung bracket 44 mounted on the main housing, this bracket being U shaped in plan. The collet 39 is split, preferably in two directions at right angles to one another, so that it may be operated to clamp the bar 38 by a small longitudinal adjustment of the tube 42. A collar 45 rigidly secured near the outer end of the tube 42 is moved to the left by levers 46 mounted in a rotatable housing 47, the lever mechanism being similar to that described hereinafter in connection with the collet 83 on the turret.

The said lever mechanism is operated by the forked upper end of a lever 48 having a pivotal support 49 on the main housing. The transmission mechanism for operating the lower arm of the lever 48 includes a lever 52 having a pivotal support 53 on the main housing, the upper end of the lever 52 carrying a roller 54 adapted to engage a cam 55 secured on the inside of the rim 56 of a control drum 57 to be hereinafter described. The lower end of the cam lever 52 is connected by a rod 58 to the lower end of the forked lever 48.

The first driving gear or headstock group of machine elements H, comprises a train of gearing adapted to drive the overhead shaft 59 extending lengthwise of the machine from the main driving shaft 1 but at a greatly reduced speed. This shaft 59 is geared to the control drum 57 whereby the various parts of the machine are operated in proper sequence. A second train of gearing rotates a turret spindle 62 driving live spindles in attachments mounted on the turret at the same speed as the main driving shaft 1 or at a slightly higher or lower speed as may be required, both the first and second trains of gearing together with hand turning gear being described hereinafter.

The turret 63 is preferably made in one piece and is supported by two extensions forming bearing journals 64, 65 which may be integral therewith. The extensions are rotatable and slidable in bearings in the inner walls of the two upper housings so that the turret may be held rigidly without overhang of the tools and may be moved lengthwise in either direction by the control drum 57 as required. The extension 64 adjacent the driving or headstock group H is mounted in a long bush 66 carried by the inner transverse wall 11 of the driving gear upper housing. The extension 65 adjacent the control group C is of large diameter and is mounted in a bush 67 carried by the inner transverse wall 15 of the upper control housing.

The turret 63 in the example shown is formed with four turret stations but six or other suitable number may be provided. The turret is shown of octagonal form, Figure 11, adapted to carry four detachable turret attachments spaced equi-angularly, one at each of the stations T1, T2, T3, T4. The stations are so positioned on the turret that each driving or tool supporting centre or station may be brought in succession into alignment with the main driving shaft 1 and locked in that position while the appropriate operations are carried out. When the turret is so locked in any one of its four positions, each of the other three turret stations is in alignment with one of the headstock stations H1, H2, H3, H4, Figure 10, mounted on the driving gear housing. The number of headstock and turret stations is the same, in this case four, the main driving shaft 1 forming one of the headstock stations H1. One or more of the other three headstock stations H2, H3, H4 may carry an operation tool, each being provided with tool holders for holding non-rotating tools such as drills, rose bits, reamers. The tool holders project from the face of a plate 264 spaced from the intermediate transverse wall 11 of the driving gear upper housing. This plate 264 is rigidly supported by bolts 265 (Fig. 10) and distance pieces or spacers 70 from the said wall 11. The tool holders extend through the plate 264 towards the wall 11 and are rigidly supported by both.

Figure 19:
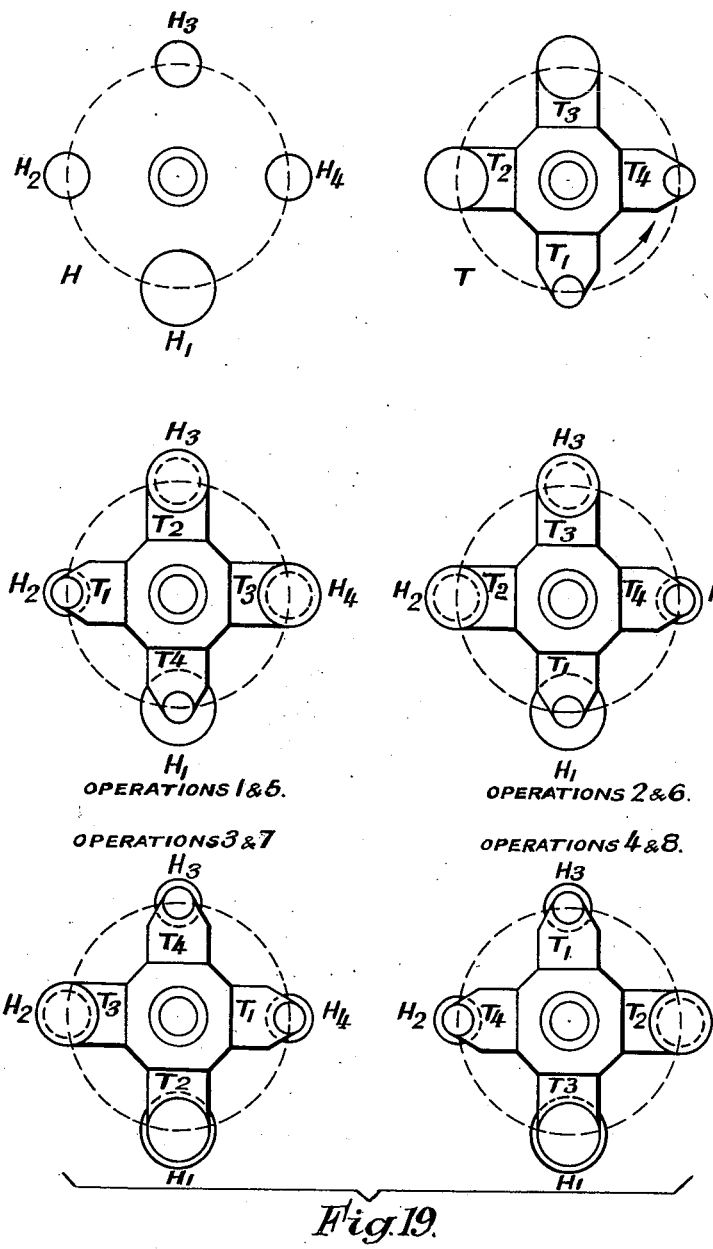
Figure 19 shows diagrammatically the relative position of the fixed headstock stations and the rotatable turret stations during a number of operations both as viewed from the right.

The upper part of Figure 19 shows diagrammatically the arrangement of the four fixed headstock stations and of the four rotatable turret stations. The headstock stations, as viewed from the right, are numbered H1, H2, H3, H4, in a clockwise direction, the main spindle 1 forming the first station H1. The turret stations, also viewed from the right, are similarly numbered T1, T2, T3, T4 in a clockwise direction, the turret being adjusted in a counterclockwise direction so that each turret station is brought into line with each headstock station H1, H2, H3, H4 in succession. Since the turret stations are viewed in Figure 19 from the right and in Figure 11 from the left, it will be noted that they are in one case lettered clockwise and in the other counterclockwise.

The component, after it has been parted from the bar stock and gripped by a collet carried at one of the turret stations, is carried by rotational adjustment of the turret to one or more of the headstock stations H2, H3, H4 in succession as required, whereby both ends of the component may be machined during the complete cycle of operations.

Each of the turret attachments is formed with a base 266 (see Fig. 11) shaped to fit on three of the turret faces and is clamped to the turret 63 by two bolts 267 (see also Figs. 1a and 1b) engaging an undercut longitudinal slot 68 in the turret. Two dead or non-rotating turret attachments are shown at turret stations T1, T4 provided with circular bodies 69 adapted to support tool holders 72 for non-rotating tools such as turning tools, reamers, etc. The bodies may be slotted and provided with clamping set bolts 73 or other means for securing the tool holders rigidly. One of the tool holders 72 with two cylindrical cutting tools 74 and a drill 75 is shown in the lower part of Figure 13.

The other two live or rotatable turret attachments (Figure 13) at turret stations T2, T3 are shown as adapted to support rotatable elements 274, preferably by means of ball bearings 275 held in the outer ring shaped part 76 of the attachment as shown in the upper part of Figure 13. Means is provided for rotating said elements at speeds equal to, greater than or less than the main driving shaft 1 and in the same direction according to the operation required. Attachments with rotating or non-rotating elements are arranged in any desired order around the turret to suit the operations called for on any component within the capacity of the machine. Each rotatable element is driven by gearing from a gear wheel 78 on the live or rotatable spindle 62 which is coaxial with the turret axis and is parallel to the axis of the main spindle 1. A long gear wheel 82 on each rotatable element is driven through an idler 79 from the common gear wheel 78. The arrangement allows lengthwise adjustment of the attachment along the turret to suit the requirements of any particular operation.

One of the rotatable elements may carry a collet 83, Figure 13, which may be expanded to release a finished component and then contracted to grip a second partly finished component before the said second component has been parted from the bar or stock. These expanding and contracting operations occur twice during each complete cycle of operations extending over two revolutions of the main shaft 1. The conical end of each collet is divided by radial slots 84 and engages a conical opening in the left end of the rotatable element 274. Collet 83 is integral with a tube 85 concentrically mounted within the element 274.

These collet operations may be effected by a plurality of short levers 86 pivoted on the rotatable element 274 and adjusted by a grooved operating collar 87 slidable endwise. The short levers are adapted to engage a collar 88a secured on the end of the collet tube 85 which is thus moved lengthwise towards the right into the gripping positions.

The grooved collar 87 is adjusted by pins 88 on opposite sides thereof carried by a forked lever 92, shown also in Figure 11, having pivotal connections 93 to the body or base 266 of the attachment. A ball or pin 94 on the forked lever 92 is moved so as to open the collet 83 by its engagement with an inclined surface on a fixed stop 95, shown also in Figures 1b and 12, as the turret is rotating, just before it reaches a new position in which the collet is coaxial with the bar or stock 1. After effecting such disengagement of the collet, the ball 94 moves clear of the fixed stop 95 into a position in which the collet is coaxial with the stock. The fixed stop 95 is mounted on one side of a cantilever bracket 96 carried by the transverse partition 24 in the main housing. As soon as the turret has been moved sufficiently forward with the collet 83 over the partially machined component, the collet is closed so as to grip the component. This is effected by engagement with the ball end 94 of lever 92 of an upward projection 97 from a slide 98 mounted in a groove in the bracket 96 which also supports the fixed stop 95. The slide 98 (Fig. 1b) is moved to the right in opposition to a spring 99 by a lever 101 actuated by a cam 102 on a disc 103 secured to the end of the shaft 104 carrying the control drum 57. The collet 83 remains closed for the next three successive operations until the corresponding stage in the cycle of operations on the next component is reached when it is released by engagement of the ball 94 with the inclined face of the stop 95.

The central turret spindle 62 is supported at one end by a ball bearing 105, Figure 13, the other or driving end of the spindle being driven from a hollow shaft 106 Figure 1a through a splined connection 100 allowing longitudinal adjustment of the spindle 62 to follow the movements of the turret. The hollow shaft 106 is supported at one end by a ball or roller bearing mounted in a boss 107 on the outer end wall 10 of the driving gear housing and at the other end by a needle roller bearing 108 interposed between the enlarged end of the shaft and an extension 109 of the bush 66 in which the turret extension 64 is rotatable and slidable. The rotatable element 274 (Fig. 13) carrying the collet 83 at turret station T3 is normally driven at the same speed as the main driving shaft 1 except during any special operation such as screwing or tapping.

The hollow shaft 106 is driven from the main driving shaft 1 at any one of three speeds through an intermediate shaft 111, Figures 7 and 8, to which it is connected permanently by 1 to 1 gearing 112, 113. The intermediate shaft 111 is connected to the main shaft 1 by any one of three pairs of gears, the gears 114, 115, 116 on the main spindle 1 being fixed thereto while the gears 117, 118, 119 on the intermediate shaft 111 are freely mounted but connected to the shaft one at a time by positive clutch elements 120, 121 splined to the shaft. When the single clutch element 120 is moved to the left to connect gear 117 to shaft 111, the turret spindle 62 is driven at the same speed as the main shaft 1 through the gears 114, 117 having equal numbers of teeth. When the double clutch element 121 is moved to the left to connect gear 118 to shaft 111, the turret spindle 62 is driven at a slower speed than the main shaft 1 through the unequal gears 115, 118. Similarly, when the clutch element 121 is moved to the right to connect gear 119 to shaft 111, the turret spindle 62 is driven at a higher speed than the main shaft through gears 116, 119.

It is desirable that each of these clutches 120, 121 should be operated quickly and definitely at certain stages of the screwing operation. Such operations can be carried out by cam or other mechanism, but electrical methods of operation are simpler and will enable operation at any desired stage of the process to be effected without delay.

The operations to be carried out can be defined in simple terms. The single clutch 120 which normally is in operation so as to give a one to one drive ratio, must be disengaged before the screwing operation can be carried out. As soon as this clutch 120 has been disengaged, the double clutch 121 must be moved to the left to engage the low speed gear ratio through gear wheels 115, 118. When, for example, the die nut 219 (see Fig. 9 and Fig. 20, operation 3), has completed the screwing operation, the double clutch 121 must disengage the low gear ratio and engage the high gear ratio through gear wheels 116, 119. Finally, after the die has been disengaged from the screwed component, the two clutches must be restored to their original normal position.

These operations can all be carried out most effectively in response to the forward movement of the turret from its station changing position on the right of the machine and the return towards that position. With this object a projection 203, Figure 9, extending radially outwards from the body 69 of the attachment carrying the die nut engages between two projections 204 from a rod 205 when the turret is moved by rotation into the screwing position with turret station T2 in line with headstock station H1 and main shaft 1. The rod is supported in an extension 206 from the partition 23 of the main housing so that it may be moved lengthwise to follow the outward and return movement of the turret. The other end of the rod operates switches in a control box 207 secured to the transverse partition 23 below the horizontal sheet or tray 208 see Fig. 1b which separates the compartment for the driving gear above from the motor compartment below.

The two clutches 120, 121 are operated by means of slidable rods 209, 210, Figure 8, supported in bearings in the walls 10, 11 of the upper driving gear housing, each rod operating its clutch through a fork 211, 212. The rod 209 operating the single clutch 120 is connected to a solenoid operating device 213, Figure 3, by which it may be moved into an inoperative position, the return to an operative position being effected by a spring. The rod 210 operating the double clutch 121 is connected to two solenoid operating devices 214, both solenoids having a spring return whereby the rod 210 is moved to an intermediate position. One solenoid when operated is adapted to move the rod 210 in one direction and the other when operated to move it in the opposite direction so as to engage in either case the appropriate gear. These three solenoids are operated from switches in the control box 207. The rods 209, 210 may be held in their several operative or inoperative positions by spring locking balls or like locking means. The sliding rods may be replaced by levers and links.

Figure 15:
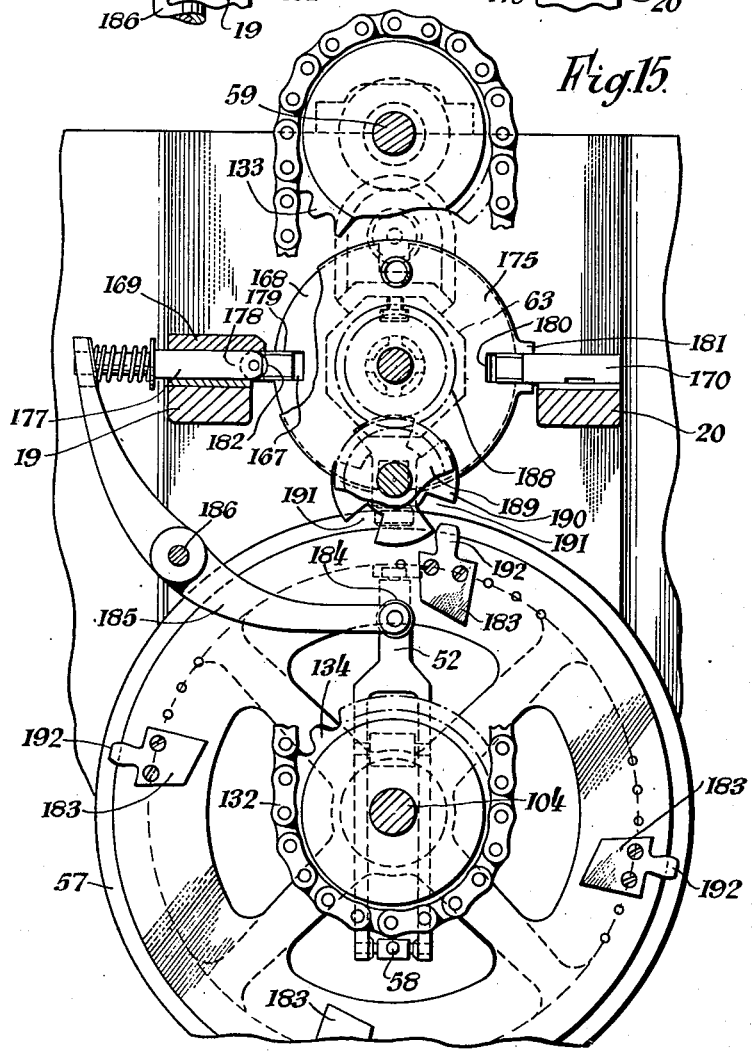
Figure 15 is a vertical section of control mechanism taken on the line 15—15 of Figure 1b.

The control drum 57 is rotated at a greatly reduced speed from the main driving shaft 1 through the train of gearing shown in Figures 1a and 1b and 2, 6 and 7 and comprising: gear wheels 114, 122 connecting the main driving shaft 1 to a longitudinal counter shaft 123; worm gearing 124, 125 connecting this counter shaft 123 to a first transverse shaft 126; gears 127, 128 connecting the first transverse shaft 126 to a second transverse shaft 129; a worm 130 on the said second transverse shaft 129 engaging a worm wheel 131 on the overhead shaft 59 running lengthwise of the machine; and a chain 132, Figure 15 running on chain wheels 133, 134 Figure 1b connecting overhead shaft 59 with the shaft 104 on which the control drum 57 is mounted.

The control drum 57 may be rotated by the hand wheel 300, Figures 2 and 7, independently of the main driving shaft 1 and of the turret. The hand wheel is placed, when required, upon the squared end of transverse shaft 129 and a clutch 135 which normally connects gear wheel 127 to transverse shaft 126, is disengaged. The longitudinal shaft 59 may then be rotated by hand wheel 100 through the worm gearing 130, 131. Gear wheel 127 is fixed to a short shaft 110 which supports the end of shaft 129, the clutch 135 being splined to shaft 110.

In addition to the tools carried at the headstock and the turret stations, two side or traversing tools 136, 137 may be provided, (see Figure 10) one behind and one in front of the axis of the main driving shaft 1, for operating on the bar or stock, the tool 136 being a parting tool. These tools are each carried by tool holders secured to platforms 140, 141 on substantial tool levers 142, 143 mounted at their lower ends on pivots 144, 145 carried by the transverse partition 23 on the lower or main housing. Considering now the mechanism towards the front of the machine for operating the parting tool 136, the tool holder 138 is adjustably secured to the platform 140 on the lever 142 as by bolts 146 and undercut slots 147 or by dovetail slides with suitable friction locking means. The platform and tool holder is located in front of the plate 264 carried by the inner wall 10 of the upper driving gear housing. An upward extension 148, from the lever 142 is offset so that it may pass between the inner wall 10 of of the housing and the plate 264. The tool lever and tool are fed towards and away from the bar or stock by a cam 149 driven through gearing 150, 151 from the slow running overhead control shaft 59. The cam 149 operates the tool lever 142 through an intermediate lever 152 having a pivotal mounting 153 on the wall 10 of the upper driving gear housing, the upper end of each lever carrying a roller 154 which engages the cam 149. The lower end of the lever 152 operates through an adjustable tension screw 155 on the upper end of the upward extension 148 of the tool lever 142 so as to feed the tool 136 towards the bar or stock, the tool lever being withdrawn by a tension spring 156. The tension screw engages a nut 157 pivotally mounted on the lower end of the intermediate lever 152 and is formed with a shoulder 158 which bears against a stop 159 pivotally carried by the upper end of the tool lever 142. The screw 155 is rotated to adjust the connection by means of an external knurled knob 160 having an extension 161 rotatable and slidable lengthwise in a bearing 162 on the cover 15. The extension is connected to the screw by a short spindle 163 and universal joints. The tool 137 is similarly operated from the cam 104 which is rotated by gearing 150, 165.

The location of the form or other tool 137 close to the main shaft collet 39 reduces overhang during operation to a minimum. The tools are operated once during each revolution of the turret.

When the turret is locked in any of its four operative positions and is moved forward towards the headstock into the working range, reliance is not placed on the usual single circular section locking pin or pins. With the object of preventing any rotational play of the turret, recesses or index slots 167 on the edge of a disc 168 secured rigidly to the turret, engage the locking edges of two long, fixed, keylike location bars 169, 170 arranged in front of and behind the turret axis. The locking arrangements are shown in Figures 2, 14, 15 and 16. The location bars are bolted to the upper surfaces of the bars 19 forming part of the upper control housing.

The reduced end 173 Figure 14 of the large diameter turret journal 65 provides a shoulder and forms a support for the rotatable turret disc 168 and a non-rotatable disc 175. The turret disc 168 is rigidly secured by set screws 176 to the shoulder and the non-rotatable disc 175 is held against longitudinal movement relatively to the turret by a circular plate 172 secured to the reduced end 173 of the turret by set screws 174. The turret may however rotate freely relatively to the non-rotatable disc 175.

The four index slots 167 provided on the periphery of the turret disc 168 correspond to the number of turret stations. When the turret is moved into its forward operative range towards the headstock, two diametrically opposite index slots 167 in the turret disc engage the locking edges of the two location bars 169, 170.

Figure 16:
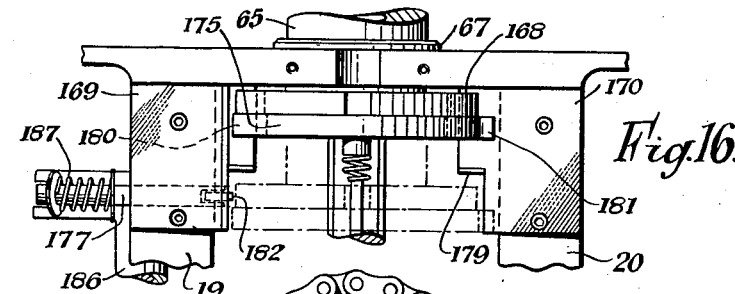
Figure 16 shows a plan of the turret locking mechanism.

When the turret is withdrawn to the limit of its movement away from the headstock, the turret disc 168 is moved clear of the locking edges of the location bars 169, 170 as shown in dotted lines in Figures 2 and 16, and is then free to rotate so that the disc and the turret may be rotated through a right angle into the next position by mechanism to be described hereinafter.

When the turret has been rotated to its new position, the slot 167 in the turret disc 168 adjacent the front location bar 169 is engaged by a movable bar 177 slidably supported in the front location bar 169. This movable bar 177, when in its forward locking position, is exactly in line with the locking edge of the location bar 169. To facilitate this exact positioning of the turret by the movable bar, the end 178 is rounded or provided with a roller 182. Further, to facilitate re-engagement of the slots 167 in the turret disc 168 with the location bars, the side of the slots and the corresponding ends of the locking edges on the location bars are formed with chamfers 179.

Two diametrically opposite slots 180 in the edge of the non-rotatable disc 175 are both in engagement with the locking edges of the location bars 169, 170 while the turret is in its forward operating range. But when the turret is moved to its rearward rotating or adjusting position, the disc is prevented from rotating only by extensions 181 which engage the rear location bar 170.

The engaging surfaces on the locating bars and on the movable bar and the corresponding engaging surfaces in the index slots are hardened and ground.

The movable bar 177 is moved into its operating position once for every quarter revolution of the turret by one of four cams 183 secured on the side of the control drum 57 and operating a roller 184 on one arm of a two armed lever 185 having a pivotal mounting 186 on the lower housing. Disengagement of the bar from a slot is effected by a spring 187. These cams also rotate the turret as will be described hereinafter.

The turret is rotated from one position to the next by means of splined connections 171 (see Figure 14) to a gear wheel 188 which is held against axial movement by a connection at one end to the end wall 16 of the upper control housing, the other end being supported under the turret extension 65. Gear wheel 188 meshes with a second gear wheel 189, Figure 15, having the same number of teeth. Rotatable with the second gear wheel is a dog plate 190 having a number of recesses 191 equally spaced circumferentially and corresponding with the number of turret stations, in this case four. These recesses are engaged in succession at intervals by teeth 192 on cams 183 carried on the side of the cam drum 57, which is rotated in proper synchronism with the other parts of the machine from the main driving shaft 59 at a comparatively slow speed. The cam drum makes two revolutions during the whole cycle of eight operations for each component.

The time intervals for the different operations in each turret position may be substantially different from one another. The several cams 183 are therefore secured in such positions on the cam drum, that their circumferential spacing is proportional to the time interval required for the slower of any two corresponding operations.

The cam drum 57 also provides for the necessary forward and rearward movement of the turret during the various operations; that is to say the turret may be withdrawn rapidly or may be fed forward slowly, in accordance with the rate of feed required for each operation. The non-rotatable disc 175 serves to effect these movements of the turret as required lengthwise of the machine. Projecting from the lower edge of the disc 175 is a pin, carrying a roller 193, Figure 1b, adapted to engage between cam surfaces on the periphery of the control drum 57.

In order that the various movements of the turret axially at different speeds, all differently spaced as regards time from one another, may be carried out by actuation of the roller 193, cam plates, the operative edges of which are shaped as required, are bolted at suitably spaced intervals on the periphery of the control drum, as shown in Figures 17 and 18. In the example shown, long plates 194 and short plates 195 provide inclined surfaces 196 adapted to effect movement of the turret towards the headstock. Opposed plates 197, are formed with inclined surfaces 198 which bring about a return movement. The cam plates are secured by set bolts 199 passing through slots 200 in the plates into suitable tapped holes 201 closely spaced circumferentially around the drum 57.

Each cam may be made from a flat plate which is machined on one straight side or edge 202 inclined at a suitable angle to other edges. The plate is next bent to a curvature such that it may be bolted to the periphery of the drum with the machined edge lying on a helical path around the periphery of the drum, one of the other edges preferably lying circumferentially. The angle or pitch of the helix depends upon the rate of feed required for any particular operation. The machined edges of the cams may be curved or otherwise shaped so that the speed of the turret lengthwise may vary at different parts of its movement according to requirements.

In the example shown in the developed view, Figure 18, eight cam plates 194, 195, four long and four short, in one row facing a series of four plates 197, provide between them a channel 203 in which moves the roller 193 mounted on the pin projecting from the lower edge of the non-rotatable disc 175. The cams used in this example are of such dimensions that the forward and rearward speeds are the same in all positions of the turret, the turret remaining for the same time interval in each of its four rotational positions.

A sequence of operations for a particular design of component will now be considered by way of example, the turret carrying four attachments providing four turret stations and being rotatably adjustable to any one of four headstock stations as previously described.

The bar or stock 38, the finished component and the several intermediate stages for each operation are shown in Figure 20. The four positions of the rotatable turret relatively to the four fixed headstock stations are shown diagrammatically in Figure 19.

In the diagrammatic Figure 19, a face view H shows the four fixed turret stations, H1, H2, H3, H4 concentric with the turret axis, turret station H1 being constituted by the main driving spindle. Face view T shows the turret with its four turret stations T1, T2, T3, T4, adjustable as a whole to any one of four positions in which each turret station coincides with a headstock station. The head stock station H1 and the two turret stations T2, T3 are referred to herein as live, since each carries a rotatable element. The other stations carry only fixed or non-rotatable tools. The two live turret elements rotate normally in the same direction and at the same speed as the main spindle 1 but may be rotated slightly faster or slower as required as hereinbefore described. The diagrams show the turret diagram T superimposed upon the headstock diagram H in each of the four positions to which it may be adjusted. The complete cycle for each component includes up to eight operations during which the turret is moved through two revolutions. Successive cycles overlap so that while Operations 5, 6, 7, 8 are being carried out on one component, Operations 1, 2, 3, 4 respectively are being performed on the next following component. Similarly Operations 1, 2, 3, 4 on the one component are carried out simultaneously with Operations 5, 6, 7, 8 on the preceding component.

The eight operations will now be considered in some detail, reference being made to both Figures 19 and 20.

*Operation 1*

The collet 39 on the main spindle 1 is opened and the bar or stock 38 is fed forward by a spring device or by any of the usual means, not shown, until the end abuts against a stop 216, the stock being then clamped in the turning position by closing the collet 39. This stop may be constituted by the end of a bar or rod carried by the attachment on the non-rotating turret station T4. Alternatively, the end of the bar may abut against a stop carried independently of the turret; for example by a lever or by other mechanism operated directly or indirectly from the operating mechanism for the collet 39 or by a cam on the edge of the control drum 57.

*Operation 2*

The turret is rotated and locked in position with non-rotatable turret station T1, coinciding with live headstock station H1 constituted by the main driving shaft 1. One or more cutting operations may then be carried out. In the component under consideration, two turning tools 217, 218 cut surfaces of two different diameters each of a prearranged length, the turret being fed forward by the control drum 57 at a suitable speed. Towards the end of this cutting operation, a centre drill 75 engages the end of the component. The centre drill and the two turning tools are carried by the fixed turret attachment at turret station T1.

During this Operation 2, the form tool 137 may be brought against the bar or stock 38. In the example under consideration, this tool is brought against the far side of the component adjacent the collet 39 on the main shaft 1. In this way there is less side thrust due to overhang of the stock. The form tool may, however, be brought against the component at any other part of its length. It might, for example, be desired to modify the shape of some part towards the end of the rod which had already been machined. The form tool is carried independently of the turret and is adjusted in synchronism with the operation of the machine from the main driving shaft 1 or motor as hereinbefore described. It may be guided transversely in a linear path, instead of a curvilinear path.

*Operation 3*

The turret is again rotated and locked in a new position with live turret station T2, in alignment with the headstock station H1 or main shaft 1. The end of the partly machined component is then screwed by a die head 219 which is rotated by the live spindle in the turret attachment at a speed which is approximately 20 percent slower than that of the main shaft and in the same direction. In this way the relative speed of the die head 219 and the main shaft 1 for screwing purposes is substantially less than the actual speed of rotation of the main shaft and the component, so that the screwing operation can be carried out without slowing up the main shaft. In order to effect the withdrawal of the die head 219 rearwardly, the speed of rotation is altered so that it rotates at a speed which is approximately 20 percent higher than that of the main shaft, and in the same direction. The turret is then returned slowly, until the die head is disengaged from the end of the partly machined component.

The same principle of faster or slower relative speeds can be utilised in tapping, reaming or in any other operation which has necessarily to be carried out more slowly than turning or drilling operations.

*Operation 4*

In Operation 4, the turret is rotated and locked in such a position that live turret station T3, coincides with the main shaft 1. In this position, the collet 83 carried at the forward end of the live spindle in the turret attachment is opened. The turret is fed forward until the collet encircles a suitable part of the component and is then contracted. The component is now held firmly both by the collet 83 which rotates with the live spindle, and by the collet 39 on the main shaft. While so held the parting tool 136 separates the component from the bar stock. By reason of this method of supporting the component on both sides of the parting tool, during the parting operation, it is possible to machine the rear end of the component and the front end of the next component right across and avoid any "pip" on either end. The collet 39 on the main shaft is now operated so as to release the component which is, however, still held by the collet 83 on the live spindle on the turret.

*Operation 5*

The turret is rotated and locked in position with live turret station T3 coinciding with headstock station H4 and the turret station T4 coinciding with the main shaft 1. While the live turret spindle and first component are still rotating, the rear end of the component is fed forward against a non-rotating tool 220 mounted at headstock station H2 to carry out any required operation such as centre drilling.

While this operation is being carried out on the first component, the bar or stock 38 is fed forward until the end abuts against stop 216 at turret station T4, and the cycle of operations for a second component commences so that Operation 5 for the first component and Operation 1 for the second component are carried on simultaneously.

*Operation 6*

The turret is rotated into a position such that the rear end of the first component, while still held in the collet at turret station T3, may have a further operation effected from a tool 221 held in headstock station H3. For example, the end of the first component may engage a fixed drill, the turret being fed forward to give the necessary feed, so that a hole may be drilled for a suitable depth. Simultaneously the second component is turned and centre drilled by the tools at turret station T1, as in Operation 2 on the first component. The later operations on the first component thus overlap in time with the earlier operations on the second component.

*Operation 7*

The turret is turned to a position in which live turret station T3 coincides with headstock station H2 carrying a drill 222 of smaller diameter than drill 221, and a further hole drilled in the rear end completes the machining processes on the first component 223. The second component carried in the main collet 39 is simultaneously screwed by the die head 219 carried at live turret station T2. This operation is the same as Operation 3 on the first component.

*Operation 8*

During the course of the several operations, the first component 223, having gone through several intermediate positions, is returned by rotation of the turret to the first position in which it is coaxial with the main shaft 1. Ejection Operation 8 then completes the cycle of operations.

The collet 83 on the live spindle in the turret attachment now in line with the main shaft 1 has just been opened during the close approach of the turret to this position. The turret is now moved forward so that the collet 83 encircles the large diameter of the partially machined second component 224 which then ejects the first component 223 rearwardly through the hollow centre of the collet 83 and the live spindle. This completes Operation 8 on the first component 223. Further forward movement of the turret contracts collet 83 on to the second component 224 which is then parted from the bar or stock. This constitutes Operation 4 on the second component.

The turret is then rotated to the next position in which Operation 5 is carried out on the second component and Operation 1 on the third component.

The reference to a 20 percent difference of speed between the turret spindle 62 and the main shaft 1 is given by way of example. Other substantially different ratios could be used. Further, the turret spindle could be disconnected entirely from the main spindle for suitable intervals when required.

The turret can be rotated from one position to the next position or it can pass through one or more positions without any advancing or withdrawing movement if no operation in that position is called for.

In the foregoing description all the operations are effected automatically, but the same principles may be applied to a capstan lathe in which some or all of the adjustments and operations are carried out by manually operated means.

Cooling fluid is supplied for the cutting operation from a pump driven by an enclosed motor 225, Figure 1b, and supplied to delivery pipes such as 226, Figure 10.

I claim:

1. In an automatic turret lathe having a rotatable turret with a plurality of turret stations and a headstock having a plurality of fixed headstock stations arranged in opposition to said turret stations, means to rotate said turret and locate the same in a plurality of rotational settings with the turret stations coinciding with headstock stations at all said settings and a live spindle at one of said headstock stations, with its axis parallel to the axis of said turret; at least one of said turret stations having a live spindle on an axis parallel to the turret axis and including means to hold the free end of a bar of stock projecting from said headstock spindle, and means to drive said turret station spindle at the same rate of speed as said headstock spindle.

2. In a turret lathe having a headstock with a plurality of fixed headstock stations, a rotatable turret with a plurality of turret stations, the stations of each set being annularly positioned in concentrically arranged relation with respect to the axis of said turret, means for rotatably setting said turret for registration of each turret station in opposition to each of said headstock stations, and one of said headstock stations having a live spindle on an axis parallel to said turret axis and adapted to hold a bar of stock; a live spindle at one of said turret stations arranged on an axis parallel to said turret axis and mechanism driven from said live spindle of the headstock driving said live spindle of the turret station.

3. The structure of claim 2 in which said driving means for the turret station includes a shaft carried by said turret and arranged in coaxial relation therewith.

4. The structure of claim 3 in which said coaxial shaft is movable with said turret during longitudinal movement thereof.

5. In a turret lathe having a fixed headstock member and an opposed rotatable turret member, each of said members having a plurality of stations with means for rotatably setting the turret to register a turret station opposite the headstock stations, and one of said headstock stations having a live spindle with means to hold a bar of work on an axis parallel to the turret axis; an identical number of stations on each of said headstock and turret members with the stations of each member being arranged concentrically of the turret axis and equi-angularly spaced at equal distances from said axis whereby each of the turret stations coincides with a headstock station for all rotational settings of the turret, at least one of said turret stations having a live spindle on an axis parallel to the axis of the turret with means to hold a bar of stock on said spindle axis, and means to drive said turret spindle.

6. In a turret lathe having a headstock with a plurality of fixed headstock stations, a rotatable turret with a plurality of turret stations, the stations of each set being annularly positioned in concentrically arranged relation with respect to the axis of said turret, means for rotatably setting said turret for registration of each turret station in opposition to each of said headstock stations, and one of said headstock stations having a live spindle including means to drive the same on an axis parallel to said turret axis with said spindle being adapted to hold a bar of stock; said means for rotatably setting the turret also including means operatively connected with said turret for reciprocating the same longitudinally of its axis, one of said turret stations having a live spindle on an axis parallel to the axis of said turret, said live turret spindle and said setting means both being driven from the said driving means for said headstock spindle.

7. The structure of claim 6 in which the driving means for said live spindle of the turret station includes a speed changing mechanism, said mechanism having actuating means responsive to longitudinal movement of said turret.

8. The structure of claim 6 in which the driving connection for rotation of said turret and the driving connection for longitudinal movement of the turret are both cam operated and the cam actuating members for each of said operations is mounted on a common control drum.

9. The structure of claim 6 in which locking means against rotational movement is provided for said turret during longitudinal movement towards said headstock, said locking means comprising a pair of diametrically opposed fixed locking plates disposed at opposite sides of said turret, said turret having a locking disc rigidly fixed to said turret with opposed slotted portions receiving said plates, said plates terminating adjacent the rearward position of said disc, and cam operated means for positioning said disc in alignment with said plates at the commencement of forward turret travel.

References Cited in the file of this patent

UNITED STATES PATENTS

| | | |
|---|---|---|
| 275,431 | Spencer | Apr. 10, 1883 |
| 330,600 | Marsh | Nov. 17, 1885 |
| 1,912,515 | Davenport | June 6, 1933 |
| 1,947,800 | Rupple | Feb. 20, 1934 |
| 2,004,347 | Rupple | June 11, 1935 |
| 2,061,417 | Drissner | Nov. 17, 1936 |
| 2,087,109 | Lee | July 13, 1937 |
| 2,182,939 | Brinkman | Dec. 12, 1939 |
| 2,326,541 | Kuehn | Aug. 10, 1943 |
| 2,316,010 | Miller | Apr. 6, 1943 |
| 2,377,384 | Slovak | June 5, 1945 |
| 2,577,442 | Adams | Dec. 4, 1951 |
| 2,605,538 | Cuttat | Aug. 5, 1952 |